US005548282A

United States Patent [19]

Escritt et al.

[11] Patent Number: 5,548,282
[45] Date of Patent: Aug. 20, 1996

[54] ELECTRONIC SHELF EDGE PRICE DISPLAY SYSTEM

[75] Inventors: Chris Escritt, Olncy, United Kingdom; Magnus Hellquist, Styrsö, Sweden

[73] Assignee: Pricer AB, Upsala, Sweden

[21] Appl. No.: 237,755

[22] Filed: May 4, 1994

[30] Foreign Application Priority Data

May 5, 1993 [GB] United Kingdom ............... 9309246

[51] Int. Cl.$^6$ ........................................ G06F 7/04
[52] U.S. Cl. .................. 340/825.350; 364/464.01; 235/375; 235/383
[58] Field of Search ............... 340/825.35, 825.54; 235/383, 385, 375, 381; 364/401, 464.01

[56] References Cited

U.S. PATENT DOCUMENTS

| | | | |
|---|---|---|---|
| 4,500,880 | 2/1985 | Gomersall et al. | 340/825.350 |
| 4,821,291 | 4/1989 | Stevens et al. | 375/37 |
| 4,962,466 | 10/1990 | Revesz et al. | 340/825.350 |
| 5,172,314 | 12/1992 | Poland et al. | 235/383 |
| 5,345,231 | 9/1994 | Koo et al. | 340/825.54 |
| 5,374,815 | 12/1994 | Waterhouse et al. | 235/383 |

FOREIGN PATENT DOCUMENTS

| | | | |
|---|---|---|---|
| 0299355 | 1/1989 | European Pat. Off. | G07G 1/14 |
| 0485250 | 5/1992 | European Pat. Off. | G06F 3/147 |
| 0497533 | 8/1992 | European Pat. Off. | G06F 3/147 |
| 2247460 | 3/1992 | United Kingdom | H04Q 9/14 |
| 2249854 | 5/1992 | United Kingdom | G09F 3/18 |
| 8806773 | 9/1988 | WIPO | 340/825.350 |
| 9108539 | 6/1991 | WIPO | |

*Primary Examiner*—Michael Horabik
*Assistant Examiner*—Edward Merz
*Attorney, Agent, or Firm*—Nils H. Ljungman and Associates

[57] ABSTRACT

A system for electronically displaying prices on shelves. To improve operational reliability and to reduce the field strengths emitted, the invention teaches that the transmitter elements are laid in the vicinity of the display units on the edges of the shelves, that the components of the display units receive the energy emitted by the transmitter elements inductively, and that the control transmitter sends an alternating current to the transmitter elements in the pauses between the data packets, and recharges the power supplies of the display units.

20 Claims, 10 Drawing Sheets

ELECTRONIC SHELF EDGE PRICE DISPLAY SYSTEM

BACKGROUND OF THE INVENTION

1. Field of the Invention

The present invention generally relates to a system for the electronic display of prices on shelves, with a computer, a control transmitter connected to the computer and electronic display units fastened to the edges of the shelves, whereby at least the shelves equipped with display units are provided with electrically conducting transmitter elements which are fed an alternating current by the control transmitter and emit electromagnetic energy, whereby the control transmitter, by means of the transmitter elements, transmits to the display units data packets which contain the data to be displayed and are separated from one another in time by pauses, and whereby in each of the respective display units there is a component to receive the energy emitted by the transmitter elements. This component feeds a charging current to a rechargeable power supply. The power supply provides at least a portion of the operating current of the display unit.

2. Background Information

In the field of modern retailing, the increasing use of bar codes to identify the type and the price of products has resulted in the diminished use of individual price tags or stickers on each item of merchandise. To indicate the price of an item, a tag or label is usually affixed to the edge of the shelf on which the item is located.

However, there is generally no guarantee that the price on the label is the same as the price stored in the store computer which is used to charge the customer at the checkout. This can lead to customer complaints and possible legal action against the retailer. Moreover, when prices change, the replacement of the tags or labels on the shelf edges can generally be relatively labor-intensive, since each tag or label must essentially be prepared and replaced manually.

Accordingly, electronic price display signs have been developed which can be affixed instead of the conventional signs to the edge of the shelf, and which optically indicate the price of the merchandise and perhaps additional information. Since the electronic display units are connected to the store computer, it can generally be guaranteed that the price displayed on the sign is the same as the price which will be charged at the checkout. The central computer can also easily update the information on the respective display unit. This updating is usually done by means of a transmission which includes the specific address code for the respective display unit or the respective group of display units, as well as the price information for the merchandise in question. In this manner, it is possible to modify the indicated prices, such as for a special sale with reduced prices, with little expense or effort.

U.S. Pat. No. 4,500,800 discloses such electronic display systems which are physically connected by wires to a power source and to the store computer. One disadvantage of these systems is that the hard-wired connection is cumbersome if the tags must be moved frequently. Furthermore, the contacts between the display tags and the connecting wires are subject to wear and tear, which results in errors in the transmission of data and/or energy to the signs.

A generic system of this type is disclosed in Federal Republic of Germany Patent No. 37 31 852 A1, which corresponds to U.S. Pat. No. 4,821,291. To eliminate the hard wiring of the display units, the display units are powered with electrical energy by means of internal batteries. The information to be displayed is transmitted by electromagnetic waves which are emitted by the control transmitter connected to the central computer by means of wires laid above the shelves. The data are transferred in packets—corresponding to the display units to be updated—and between the data packets there are pauses during which no waves are emitted. As an alternative to batteries, the power supply for the display units can be in the form of storage batteries or capacitors of sufficiently high capacity, which are recharged during the transmission of the data packets by means of the electromagnetic energy received. In the generic system, the display units are also recharged with electromagnetic energy by a separate transmitter outside operating hours.

The primary disadvantage of such a system is the inefficiency of the transmission of energy to the display units. Since the wires used as the transmission elements are laid on the top of the shelves and are also shielded by the shelves, it is generally necessary to use a correspondingly high transmitter power to recharge the power source and for the error-free transmission of data, to achieve sufficiently high field strengths in the relatively distant display units. This essentially means that, on one hand, complex technical measures and high energy levels are required, and on the other hand, that other electronic devices (such as scales or cash registers) located in the vicinity could be affected by induced voltages. In addition, recharging is generally only possible during the transmission of the data packets, which further increases the field strengths which must be emitted. Store personnel and customers can also be exposed to the effects of relatively intensive electromagnetic fields. If the recharging process is performed before and after business hours, on the other hand, large and expensive storage batteries and capacitors with a high charge capacity are generally necessary to guarantee the operation of the display units throughout business hours.

OBJECT OF THE INVENTION

The object of the invention is to create a reliable system for the electronic display of prices on shelves, a system characterized by substantially error-free and efficient transmission of energy and data to the display units. The object of the invention is also to realize a system which has both the flexibility of display units connected to the computer using wireless technology, as well as the reliability of displays powered by hard-wired connections.

SUMMARY OF THE INVENTION

The invention teaches that the object can be achieved, in accordance with at least one preferred embodiment, by installing the transmitter elements in the vicinity of the display units on the edges of the shelves, by having the components of the display units receive the energy emitted by the transmitter elements inductively, and by having the control transmitter send an alternating current to the transmitter elements in the pauses between the data packets, to recharge the power supplies of the display units. Preferably, such recharging can take place during the pauses between data packets.

The basic idea of the invention is, on the one hand, to install the transmitter elements powered by the control transmitter in the immediate vicinity of the display units on the edges of the shelves, so that an efficient inductive energy transmission is possible. On account of the elimination of the antennas tuned to the transmission frequency, the inductive energy transmission is also economically realizable. On the other hand, the idea is to take advantage of the pauses between the data packets to recharge the power sources of the display units. Since the control transmitter sends an alternating current to the transmitter elements installed on the front side of the shelves in the pauses between the data packets, on account of the magnetic field which surrounds the transmitter element and which varies as a function of time according to Faraday's law, a voltage is induced in the component of the display element designed to receive the emitted energy (a coil, as a rule), which is rectified and used to recharge the power source. The power source feeds the display unit with the operating current required for the operation of the display proper and of the other electronic components.

The advantages of the invention are that the display units can each be installed essentially in any desired position, independent of the data to be displayed, without requiring the time-consuming laying of a galvanic connection with the store computer. The frequent replacement of the internal batteries of conventional displays not powered by hard-wired connections can also be eliminated; and the maintenance costs are also lower than for known systems. The decisive factor, however, is that on account of the short distance between the transmitter element and the display unit, the inductive transmission of energy and the utilization of the pauses between data packets to recharge the power supply, it is possible to use a significantly lower transmitter power than in known systems which operate with electromagnetic waves, to maintain a charge in the power supplies and to supply the display unit with electric current. On account of the significantly higher efficiency of the energy transmission, there is thus essentially no need to fear any negative impact of the transmitter element on the environment in the form of electromagnetic waves. On account of the lower transmitter power, the control transmitter can also be significantly smaller and be manufactured significantly more economically. Finally, it is possible to use, as transmitter elements, any wires for conventional display units which may already be present on the edges of the shelves, so that essentially all that is necessary is the replacement of the display units.

Preferably, the data packets are transmitted inductively from the central store computer via the control transmitter and the transmitter elements on account of the optimal security of transmission (there is essentially no reason to fear interference or shielding) to a coil or similar device contained in the display elements, although an electromagnetic or capacitive data transmission would also be conceivable.

Storage batteries and/or capacitors of sufficiently high capacity can preferably be used as the rechargeable power supply for the display unit. The storage batteries and/or capacitors are appropriately selected so that at least the contents of the memory in the display units can be held in memory for a period of several days, even after the disconnection or failure of the control transmitter.

In the context of the invention, various possibilities exist to recharge the power supply during the data transmission phase.

On one hand, the invention recommends, in one preferred embodiment thereof, that the energy emitted during the transmission of data by the transmitter elements is also received inductively and used to recharge the power supply, to further increase the efficiency of the energy transmission.

On the other hand, the invention teaches that the control transmitter can alternately switch back and forth in alternation between a data transmission phase and a recharging phase, so that there is essentially no reason to fear any adverse effect on the fail-safe nature of the system (which is highly desirable for its optimal operation) on account of the alternating currents in the transmitter elements used for recharging. The display units essentially recognize the respective phases on the basis of the induced voltages and switch internally from one to the other.

In the concrete case, the alternating current flowing through the transmitter elements in the pauses between the data packets, i.e. during the recharging phase, tends to have a constant frequency and amplitude. The result is that the recognition of the recharging phase by the display elements is facilitated, and on account of the constant parameters of the induced voltages, an efficient, low-loss sizing and regulation of the recharging current of the power supplies easily becomes possible. It would also be conceivable, however, to vary the amplitude and frequency of the alternating current (or the duration of the recharging phases) as a function of the level of the charge of the power supplies, if the display units emit a status signal to the control transmitter concerning their operating voltage. It is also possible to vary the duration of the charging phase, as a function of the level of charge in the display units.

To make possible an inductive transmission of data to the display units according to Faraday's law, it is also appropriate to have the control transmitter modulate the data packets on an alternating current of constant frequency and amplitude which can be used as a carrier. Frequency modulation is thereby preferred, because it is significantly less sensitive to external factors than amplitude modulation. Theoretically, it is also possible to superimpose the data on an alternating current.

To distinguish between the data transmission phase and the recharging of the power supplies in the display units, the invention recommends, in at least one preferred embodiment thereof, that the control transmitter transmit alternating currents of different amplitude and/or frequency in alternation to the transmitter elements (corresponding to the respective phase). In the display units, the distinction between the two phases can be made easily on the basis of the frequency or amplitude of the induced voltages. The advantage, in particular for a differentiation on the basis of frequency, is that there is essentially no reason to fear interference by the recharging phases with the transmission of data.

The display units can also send an acknowledgment to the computer after receipt of the data packets addressed to them. A corresponding data packet is preferably converted by means of an inductance contained in the display unit into a magnetic field which varies as a function of time, and which induces a voltage in the adjacent transmitter element which is transmitted to the computer by the control transmitter. It is apparent that, during the acknowledgment phase, essentially neither a charging of the power supplies nor a data transmission from the control transmitter to the display unit can take place, since it would essentially not be possible to correctly receive the relatively weak acknowledgment signals.

There are also various possibilities for the concrete design of the component of the display units used for reception. To reduce the manufacturing costs and the amount of space required, the invention teaches, on the one hand, that the display units can preferably be equipped with only one component (i.e. one coil), which is used to receive both the data and the recharging currents. On the other hand, it is also possible to divide the tasks between two separate components, each of which can easily perform its specific function.

An appropriate component for reception of the energy emitted by the transmitter elements is a flat coil wound in layers.

Various embodiments of the transmitter elements are also conceivable in the context of the invention. For example, they can be single-conductor or multiple-conductor cables, or can be in the form of a ribbon cable. To protect the transmitter elements against damage and to facilitate their installation, it is also appropriate to shape, possibly even mold or embed, the transmitter elements into a profile which forms the edge of the shelf.

The magnetic field strengths in the display units can be increased if at least the portions of the transmitter elements adjacent to the displays are laid in the form of loops. The advantageous result is an increase in the voltages induced and an improvement, in particular in the security of data transmission.

The data to be transmitted to the shelf edge display units and optically displayed by the display units are stored in a central computer which can be located, for example, in the main office of a retail chain, and which can preferably transmit the data via telephone lines or other suitable devices to the computers in the individual stores. But the computer in the main office can also be eliminated, if the data are stored in the individual store computers. In the context of the invention, the term "computer" is used to include all electronic data storage and processing devices, e.g. including an EPOS (Electronic Point of Sale) or similar devices.

The data are preferably transmitted by any desired combination of the above-referenced computer systems by means of one or more control transmitter. The control transmitter can be hard-wired to the transmitter elements. Alternatively, the data can also be transmitted from the computer to the control transmitter and/or from the control transmitter to intermediate devices (which power the transmitter elements) by means of a wireless connection, which can use low-frequency, high-frequency or optical electromagnetic waves.

To avoid reducing the useful life of the power supply by overcharging the power supply, the display units can preferably limit the recharging current, as soon as the voltage exceeds a specified threshold value.

If one or more display units are removed from the shelf for a rather long period of time which is longer than the discharge time of the internal power source, the display units can preferably be stored in a separate recharging station, in which they would receive an alternating magnetic field which is used to recharge their power supplies.

In summary, one aspect of the invention resides broadly in a system for the electronic display of information on at least one shelf. The system comprises at least one display unit for displaying information. The at least one display unit has an arrangement for disposing the at least one display unit on a shelf arrangement. The at least one display unit comprises at least one shelf display unit. The system further comprises an arrangement for transmitting power to the at least one display unit, the transmitting arrangement for being disposed apart from the at least one display unit. The at least one display unit comprises: an arrangement for receiving power from the transmitting arrangement; an arrangement for displaying information; and arrangement for powering the displaying arrangement at least partly from the power received by the receiving arrangement. The receiving arrangement comprises an arrangement for receiving power from the transmitting arrangement solely upon the at least one display unit being disposed substantially adjacent to at least a portion of the transmitting arrangement.

Another aspect of the invention also resides broadly in a system for the electronic display of information on at least one shelf. The system comprises at least one display unit for displaying information, the at least one display unit having an arrangement for disposing the at least one display unit on a shelf arrangement. The at least one display unit comprises at least one shelf display unit. The system further comprises an arrangement for transmitting signals to the at least one display unit to provide data to the at least one display unit, the transmitting arrangement for being disposed apart from the at least one display unit. The at least one display unit comprises: an arrangement for receiving signals from the transmitting arrangement; an arrangement for displaying information based on signals transmitted from the transmitting arrangement; and a rechargeable arrangement for powering the displaying arrangement. The transmitting arrangement comprises an arrangement for at least substantially continuously providing, to the receiving arrangement of the at least one display unit: data for the display of information on the displaying arrangement; and power for providing energy to the rechargeable arrangement.

Yet another aspect of the invention resides broadly in a method of operating a system for the electronic display of information on at least one shelf. In this method, at least one display unit is provided for displaying information, the at least one display unit having an arrangement for disposing the at least one display unit on a shelf arrangement. The at least one display unit comprises at least one shelf display unit. An arrangement is provided for transmitting power to the at least one display unit. The step of providing the at least one display unit comprises: providing an arrangement for receiving power from the transmitting arrangement; providing an arrangement for displaying information; and providing an arrangement for powering the displaying arrangement at least partly from the power received by the receiving arrangement. The step of providing the receiving arrangement comprises providing an arrangement for receiving power from the transmitting arrangement solely upon the at least one display unit being disposed substantially adjacent to at least a portion of the transmitting arrangement. The method further comprising the additional steps of: disposing the at least one display unit on a shelf arrangement; disposing the at least one display unit substantially adjacent to at least a portion of the transmitting arrangement; transmitting power to the at least one display unit with the transmitting arrangement; receiving power, with the receiving arrangement, from the transmitting arrangement solely upon the at least one display unit being disposed substantially adjacent to at least a portion of the transmitting arrangement; displaying information with the displaying arrangement; and powering the displaying arrangement at least partly from the power received by the receiving arrangement.

BRIEF DESCRIPTION OF THE DRAWINGS

Several embodiments of the invention are explained below in greater detail with reference to the accompanying drawings, which show schematically.

Figure 17:
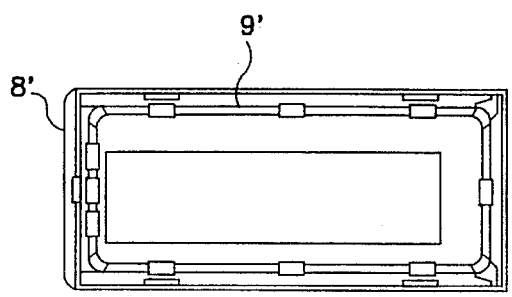
Figure 18:
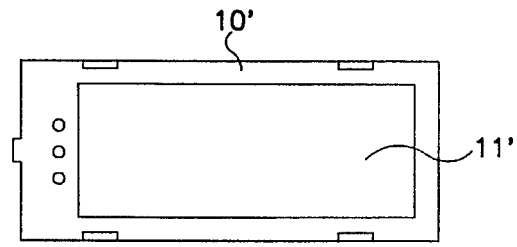
Figure 19:
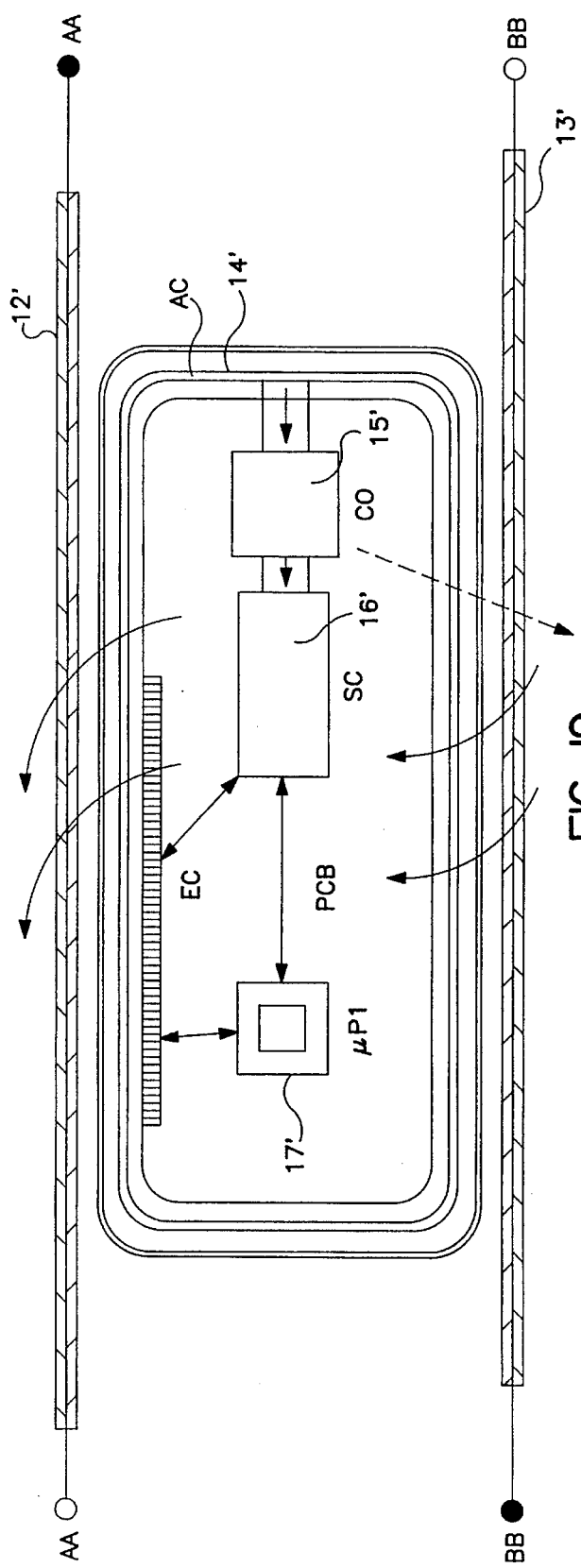
Figure 20:
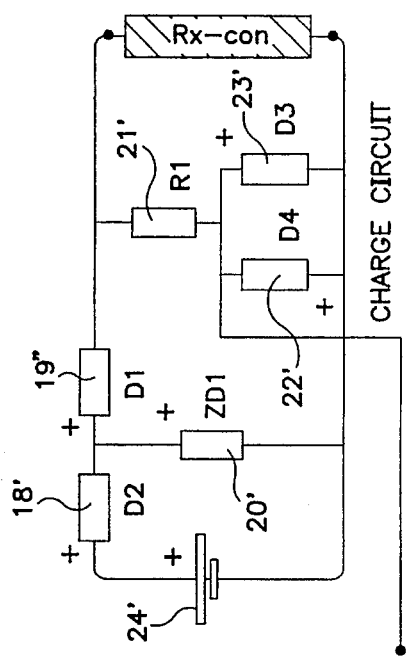

For a further understanding of at least one preferred embodiment of the present invention, and to show how the same may be carried into effect, reference will also be made, by way of example, to further drawings, in which:

FIGS. 7 to 16 show various embodiments of the invention in the form of a display unit mounted on a shelf edge moulding, both face-on and in perspective;

FIG. 17 shows a rear view of an empty display unit case, revealing a set of inductive coils;

FIG. 18 depicts the internal face of the back cover of a display unit, which cover comprises a charge foil laminate;

FIG. 19 shows a cut-away schematic of a preferred embodiment of a display unit in use; and FIG. 20 shows the circuit layout of a charge circuit in FIG. 19.

DESCRIPTION OF THE PREFERRED EMBODIMENTS

Figure 1:
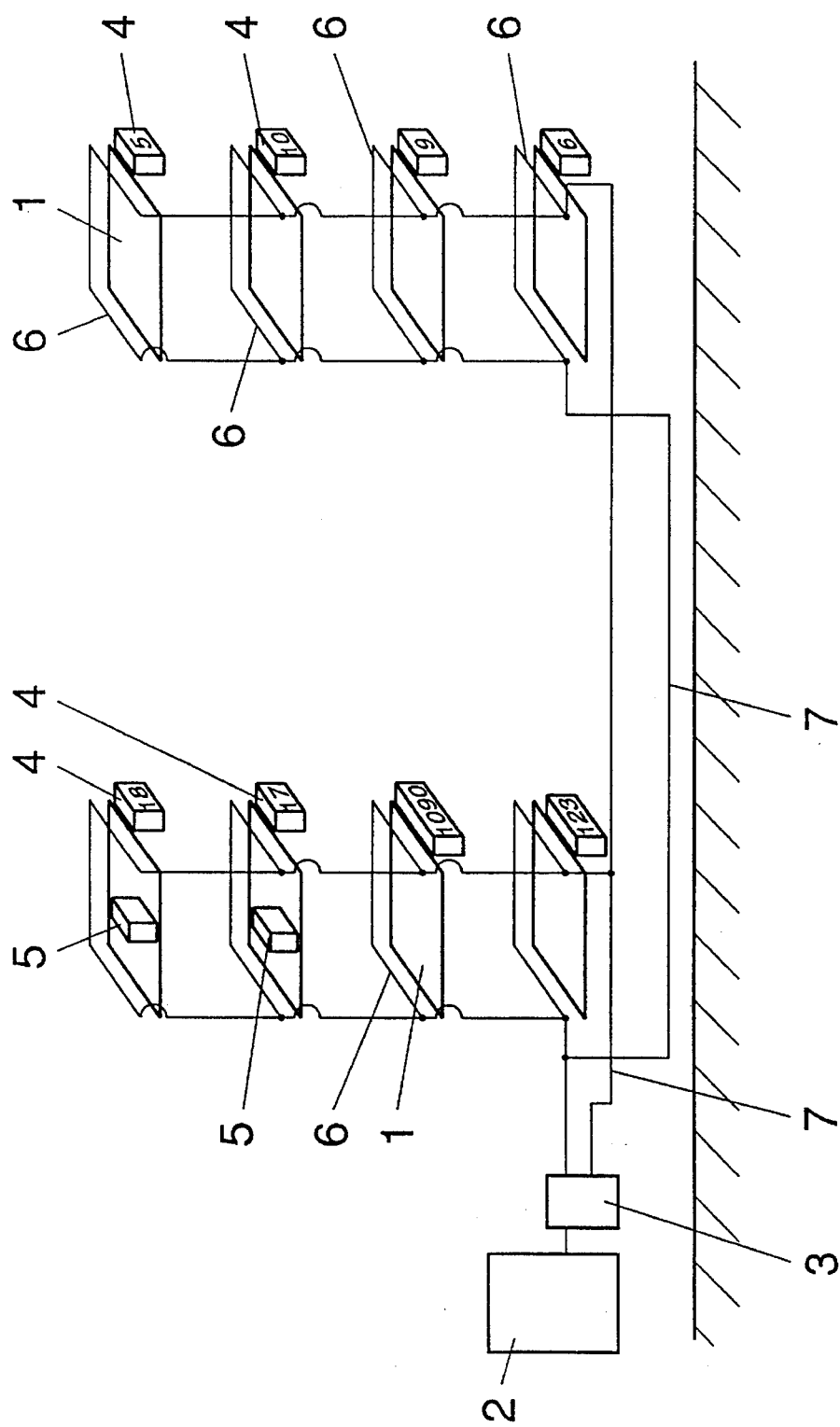
FIG. 1 a view of a system for electronically displaying prices.

The system for electronically displaying prices illustrated in FIG. 1 can be used, for example, in a retail store. The shelves (1) arranged above and next to one another can be loaded with merchandise (5), the selling price of which merchandise can preferably be indicated by electronic display units (4). The data displayed by the display devices are preferably stored in a central computer (2) and are preferably inductively transmitted by means of a control transmitter (3), and transmitter elements (6) preferably laid on the edges of the shelves (1), to the display units (4) fastened in the immediate vicinity of the transmitter elements (6). The control transmitter (3) and the transmitter elements (6) can preferably be connected to one another by supply leads (7). The drawing does not show that the control transmitter (3), in the pauses between the transmission of the individual data packets, also preferably sends an alternating current through the transmitter elements (6), which current preferably induces a voltage used to recharge the power source of the display units (4) (see, however, FIG. 6).

Figure 1A:
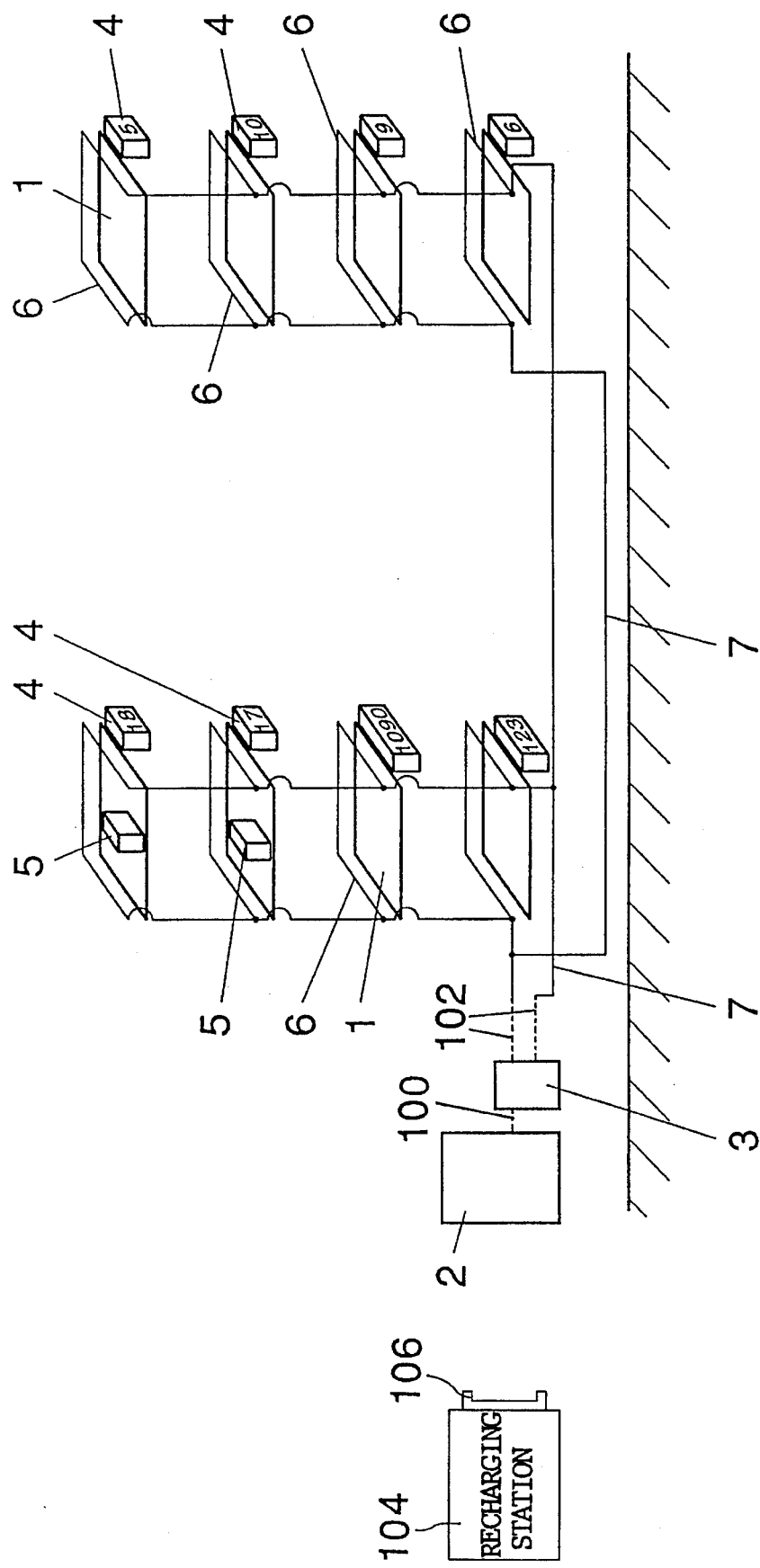
FIG. 1a: an alternative embodiment of the system illustrated shown in FIG. 1.

FIG. 1a is substantially the same view as FIG. 1, but illustrates an alternative embodiment in accordance with the present invention. Particularly, as illustrated in FIG. 1a, it is conceivable to provide a wireless connection between control transmitter (3) and transmitter elements (6), or even between computer (2) and control transmitter (3). Appropriate types of wireless connections in this vein, such as radio transmission, electromagnetic transmission, and other types of transmission, are generally well-known to those of ordinary skill in the art and will not be further described here. The general paths of the wireless connections in question are schematically indicated in FIG. 1a at (100) and (102).

FIG. 1a also illustrates an additional component contemplated by the present invention, namely recharging station (104). As illustrated, recharging station (104) can preferably be remote from the rest of the system and may essentially be configured for recharging individual display units (4) in the event that such display units (4) are removed from the shelves (1). Accordingly, the recharging station (104) may include an appropriately configured receptacle (106) for accommodating one or more display unit or units (4) and recharging the corresponding power supply or supplies of the display unit or units. The general makeup of such a recharging station (104) is considered to be well within the purview of the skilled artisan and, as such, will not be further discussed herein.

Figure 2:
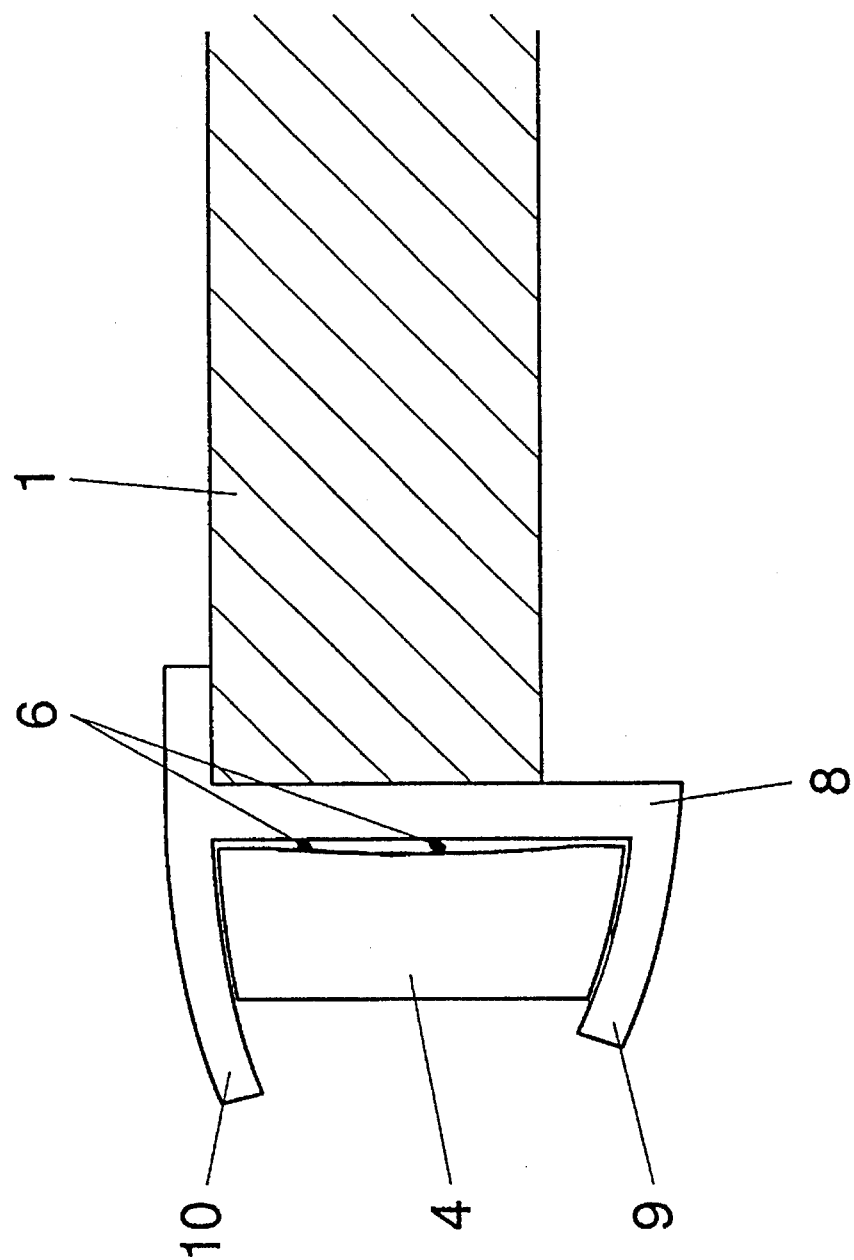
FIG. 2: a cross section through a shelf equipped with a display unit.

FIG. 2 shows that the display unit (4) can preferably be protected inside a profile (8) fastened to the edge of the shelf (1). A leg (9) of the profile (8), which can preferably run diagonally upward, is preferably in contact with the underside of the display unit (4), while the top of the display unit is preferably in contact with a second leg (10) of the profile (8), wherein the profile (8) itself preferably runs vertically downward. Preferably, the upper leg (10) is configured to improve the legibility of the displays, so as to preferably shield the displays from the light which comes from above. The display unit (4) can preferably be configured to move along the axis of the profile (8) and removed therefrom (after loosening a fastening device, if such a device is present). Two transmitter elements (6) in the form of wires preferably run on the reverse side of the display unit (4) on the surface of the vertically-oriented part of the profile (8) in contact with the display unit (4). The transmitter elements (6) are preferably oriented parallel to the axis of the profile (8) and are preferably disposed above one another. Preferably, the transmitter elements (6) are fastened to the profile (8), such as by means of a welded joint.

It should be appreciated that the profile (8) may alternatively be considered to be a "protective cover". Additionally, the second leg (10) may preferably be configured to run diagonally downward with respect to the view shown in FIG. 2. The aforementioned "axis" of profile (8) may preferably be considered to be parallel to the shelf edge in question.

Figure 3:
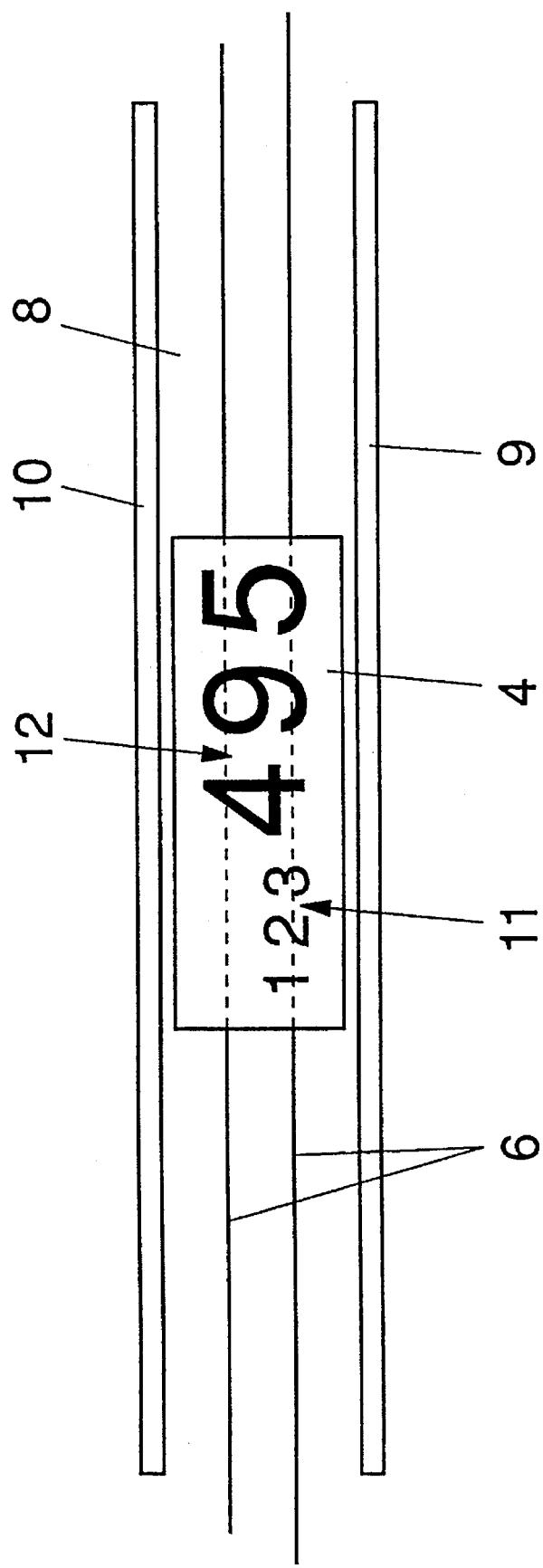
FIG. 3: a view of a shelf equipped with a display unit.

FIG. 3 shows a front view of the profile (8) with a display unit (4). As shown in FIG. 3, the display unit can preferably display a set of small numbers (11), which can preferably indicate product information, e.g. the product number, and a set of larger numbers (12) which can preferably indicate the price. Alphanumeric displays can also conceivably be used instead of the numbers (11, 12). It should be noted that it is possible to supply only one transmitter element (6) with current, and to use the second as a backup unit in case of malfunction or failure. On the other hand, if both transmitter elements (6) are operated, currents can conceivably flow through them in the same or opposite directions.

Figure 4:
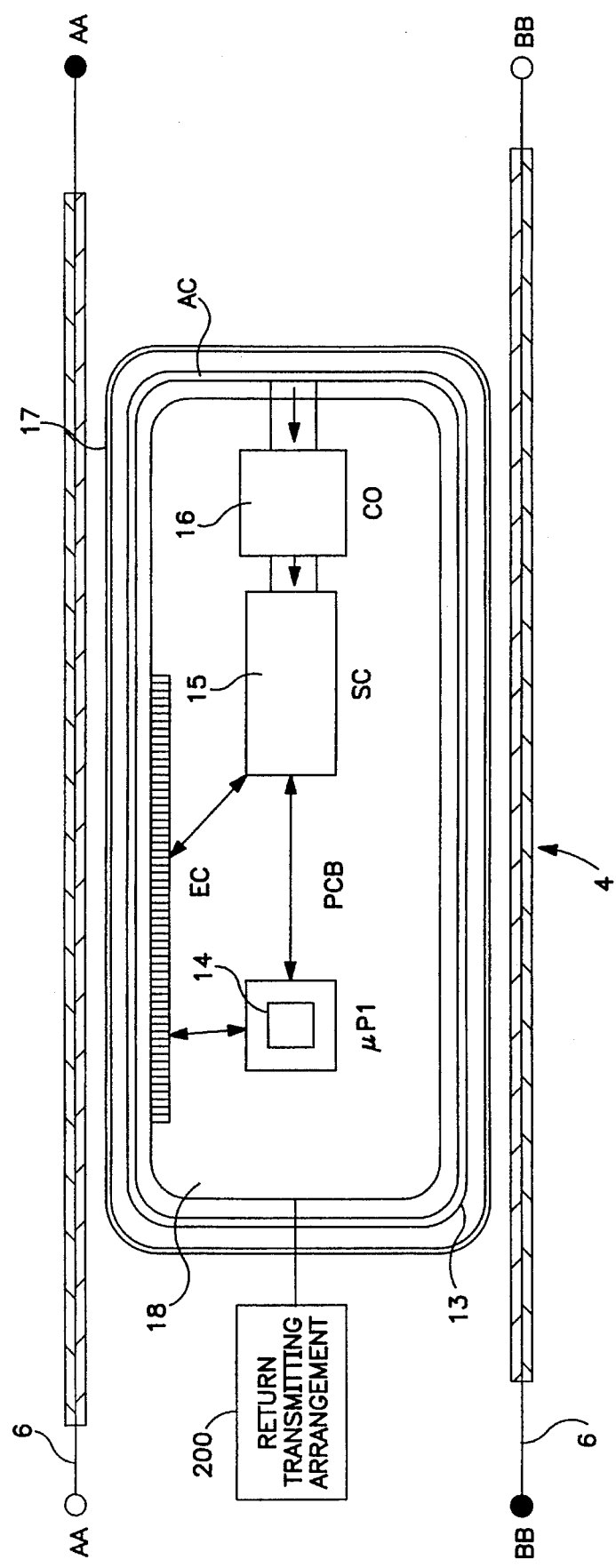
FIG. 4: the inside of a display unit.

FIG. 4 schematically illustrates the internal structure of a display unit (4). Inside a housing (17), the electronic components are preferably fastened to a printed circuit board (18). A component (13) for the inductive reception of the power emitted by the transmitter elements (6) is preferably a coil in the shape of a frame. This coil (13) preferably runs azimuthally on the inside wall of the housing (17), and is preferably connected to a rectifier circuit (16). The current which occurs as a result of the induced voltages is preferably used to charge a power supply (15), which, in the illustrated example is shown as a capacitor, and the power supply (15) preferably provides power for a microprocessor (14) and, strictly speaking, for the numerical displays (11, 12). The microprocessor (14) preferably updates the numbers (or letters) displayed if it receives a data packet specifically addressed to the display unit (4). In the illustrated embodiment, two transmitter elements (6) preferably run at some distance above and below the display unit (4).

The aforementioned component (13) can conceivably be considered to be in the shape of the housing (17).

Figure 5:
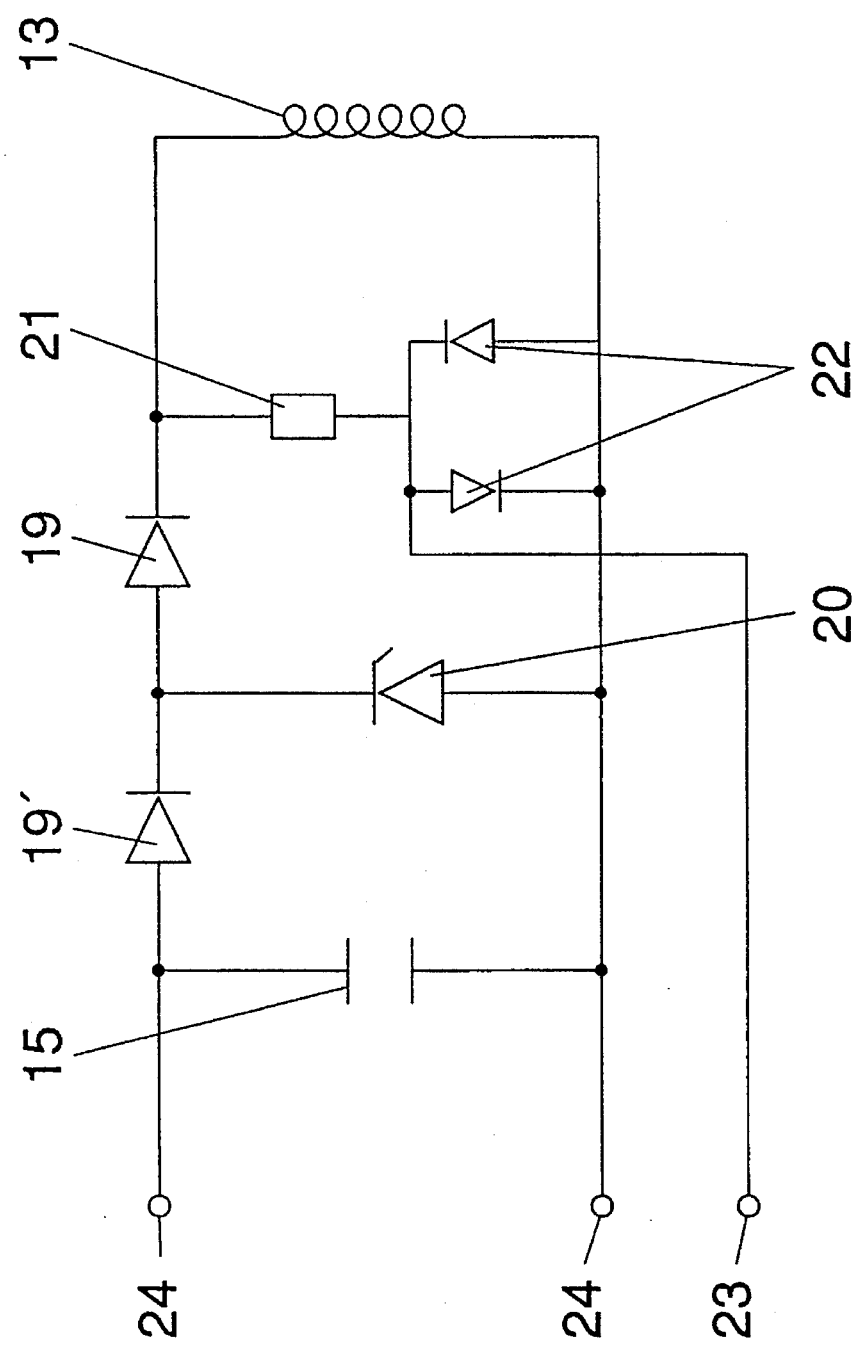
FIG. 5: a circuit to separate the recharging current from the data packets.

FIG. 5 illustrates a rectifier and recharging circuit, of the type which can be used in the embodiment illustrated in FIG.

4. The alternating current induced in the component (13) used for reception, i.e. a coil, is preferably rectified by means of a diode (19) and reduced to the desired operating voltage by a Zener diode (20). A Schottky diode (19') connecting the cathode of the Zener diode (20) to the power supply (15) (in this case a capacitor) preferably reduces the undesirable leakage current of the Zener diode (20), and preferably recharges the capacitor to the operating voltage (24). The resistance (21) and the diodes (22) in inverse-parallel connection preferably limit the induced voltage to a voltage (23) appropriate to the input stage of the microprocessor (14). This circuit thereby makes it possible to use essentially only one component (13) both to receive data packets and to recharge the power supply (15).

Figure 6:
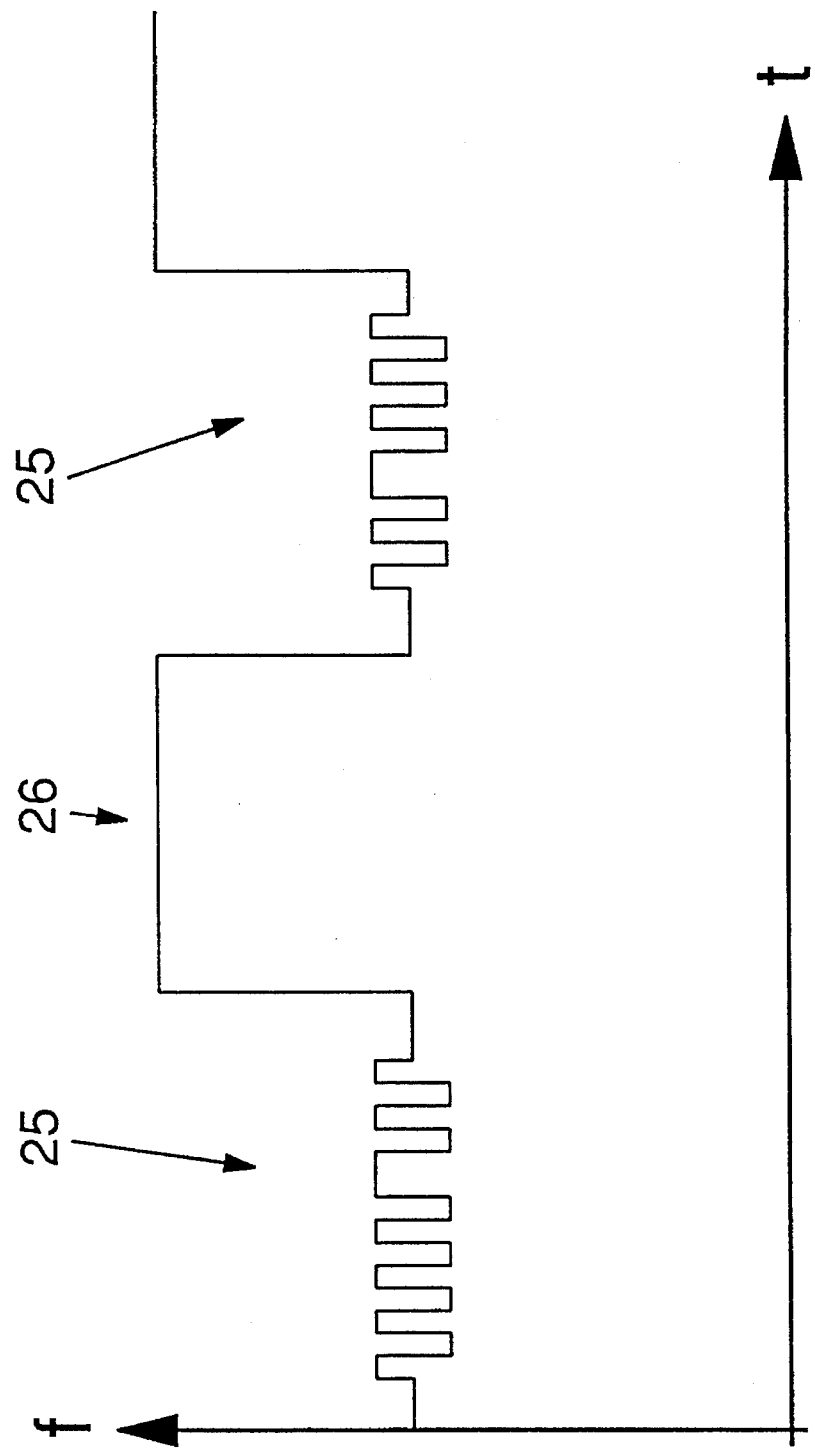
FIG. 6: a curve which illustrates the frequency of the alternating current over time.

FIG. 6 shows the curve of the frequency of the current which flows through the transmitter element (6) as a function of time. During the phases of transmission of the data packets (25), a relatively low frequency is preferably frequency-modulated by a fraction (approximately one-fifth) of its amount, while the frequency in the pauses between the data packets is preferably approximately doubled and remains constant. The display units (4) can thus easily distinguish between the two phases, on the basis of the frequency of the induced voltages.

It should be understood that the above examples of frequencies are essentially provided for the purposes of illustration and that other variations in frequency can also be realized within the scope of the present invention.

It will be appreciated from the foregoing that the general result of the present invention is a system for indicating prices on shelves which is characterized by reliability and low maintenance costs.

It will also be appreciated from the foregoing that variations on the preferred configurations discussed above are conceivable within the scope of the present invention. For example, for the purpose of wirelessly transmitting energy to the different display units (6), it is conceivable to employ infrared, capacitive, electromagnetic, or optical arrangements, as well as inductive arrangements. Optical arrangements could conceivably include the use of lasers. For the power supply (15), it is conceivable to utilize, for example, a battery-type arrangement or even a type of arrangement involving non-volatile memory. Additionally, for the transmission of data, it is conceivable to provide a constant alternating current with data superimposed thereupon.

The disclosure now turns to related embodiments of the present invention, as illustrated in FIGS. 7 through 20. It should be understood that various components discussed hereinbelow with relation to FIGS. 7–20 can be considered to be interchangeable with components discussed further above with relation to FIGS. 1–6

Figure 7:
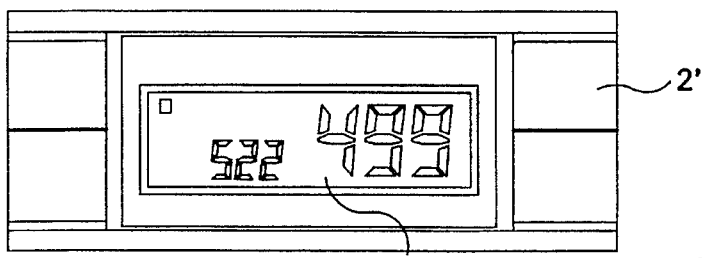
Figure 8:
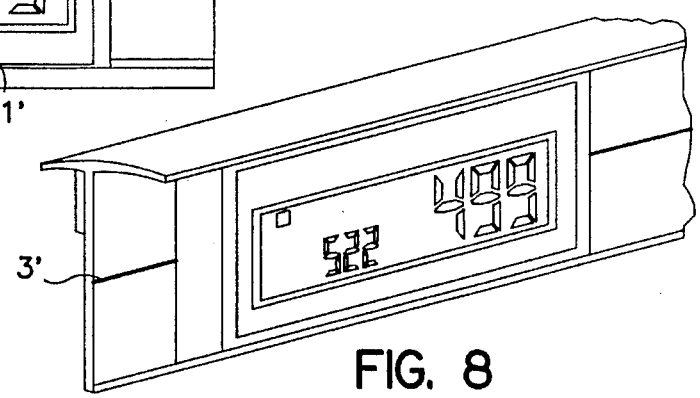

Referring now to FIGS. 7 and 8, there is shown an electronic display unit 1' mounted on a shelf edge profile 2'. The shelf edge profile 2' includes a single wire 3' which acts as a charge carrier.

Figure 9:
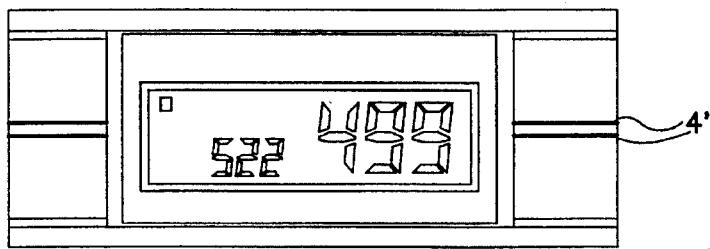
Figure 10:
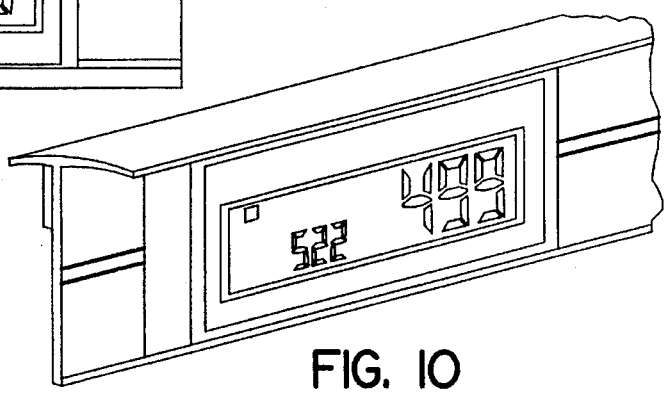

Referring now to FIGS. 9 and 10, there is shown an electronic display unit and a shelf edge profile as in FIGS. 7 and 8, but instead of a single wire, there are provided two wires 4' which act as charge carriers.

Figure 11:
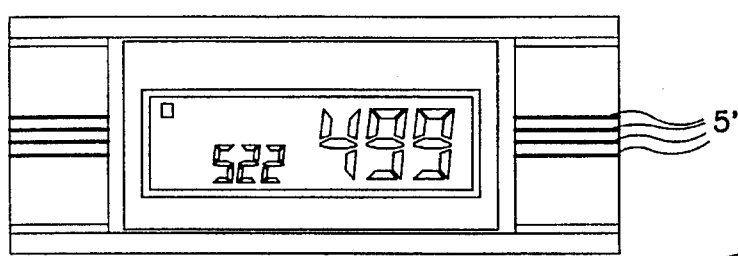
Figure 12:
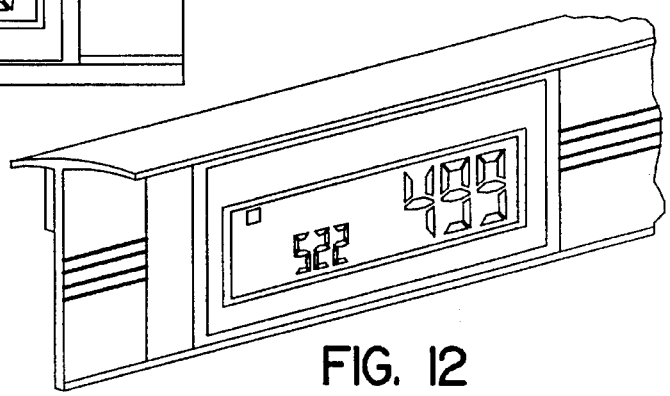

FIGS. 11 and 12 depict a similar arrangement to those shown in FIGS. 7 to 10, except in that the shelf edge charge carriers comprise four wires 5'.

Figure 13:
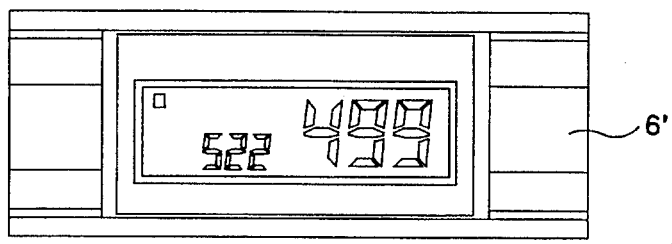
Figure 14:
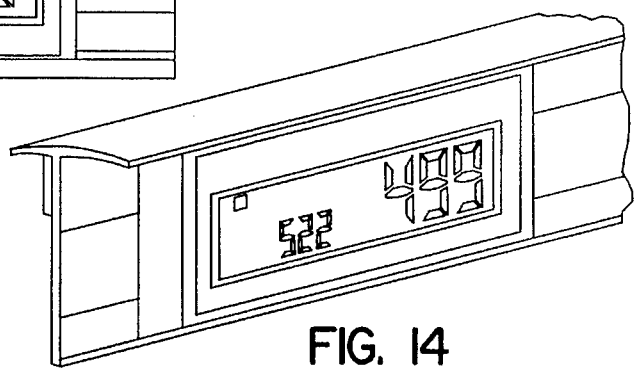

FIGS. 13 and 14 depict an electronic display unit and a shelf edge profile wherein the shelf edge profile includes a flat ribbon 6' as a charge carrier.

Figure 15:
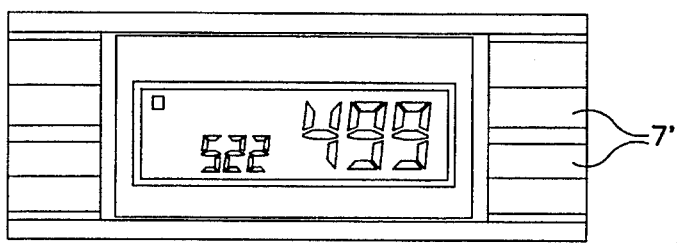
Figure 16:
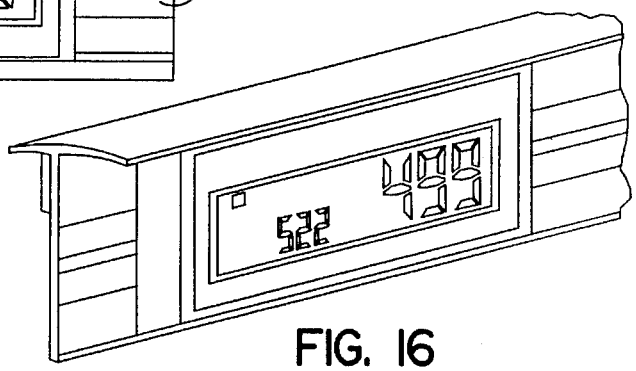

FIGS. 15 and 16 show an arrangement substantially similar to that depicted in FIGS. 13 and 14, except in that two flat ribbons are used as charge carriers.

Referring now to FIG. 17 there is shown a rear view of a display unit case 8' which includes a set of inductive coils 9'. These inductive coils 9' may receive and transmit data from and to a shelf edge charge carrier or carriers 3', 4', 5', 6', 7' by means of electromagnetic inductive coupling. The inductive coils 9' may also have electrical power induced in them with which to power the display unit and/or recharge an internal battery (not shown).

It will be appreciated that FIG. 17 may be considered to illustrate a "case with inductive coils enclosed".

FIG. 18 depicts the internal face of the back cover 10' of a particular embodiment of display unit. The back cover 10' includes a charge foil laminate 11'. The charge foil laminate 11' receives electrical power from a shelf edge charge carrier or carriers by means of conductance or charge coupling. This electrical power is then used to power the display unit and/or to recharge an internal battery (not shown).

It will be appreciated that FIG. 18 may be considered to illustrate an "internal face of a back cover with charge foil laminate".

FIG. 19 shows a cut-away schematic of a preferred embodiment of display unit in use. The shelf edge charge carriers 12', 13' are connected as outlined above to a control transmitter unit (not shown) either directly or via an intermediate slave and/or process controller (not shown). The system may function satisfactorily with either charge carrier 12' or 13' operating independently by adjusting the coupling level to the display unit 1' by varying either the number of display unit antenna coils 14' and/or the voltage applied to the shelf edge charge carriers. The RMS voltage level on the charge carriers is typically 24 volts, but this may be varied according to the distance between the display unit and the charge carriers. The frequency of the alternating voltage on the charge carriers is nominally the same as that used for the communication of data signals to the display unit and in this preferred embodiment may vary between 36 kHz to 120 kHz. Coupling between the charge carriers 12' and/or 13' and the display unit 1' induces an alternating voltage in the antenna coils 14'. This alternating voltage then passes via charge circuit 15' and support circuit 16' to microprocessor 17'. Price and other data transmission and reception may still occur at any time via the support circuit 16'.

FIG. 20 shows the circuit layout of charge circuit 15' in FIG. 19. This circuit contains two schottky diodes 18', 19" and a zener diode 20'. The alternating current received from the antenna coil 14' is rectified by diode 18' and clipped by zener diode 20' to the nominal battery voltage. Diode 19" serves to reduce the current leakage that would otherwise occur through zener diode 20'. The component set consisting of resistor 21' and diodes 22', 23' serves to clip the input signal to the level required by the preamplifier stage of the VLSI circuitry of microprocessor 17'. Chargeable battery 24' has a nominal capacity of 3 mAh or 7 mAh, and a potential of 3 volts. It is kept charged by the action of charge circuit 15'.

It will be appreciated the FIGS. 19 and 20 may be considered to illustrate a "chargeable tag schematic layout and principle of operation".

One feature of the invention resides broadly in the system for the electronic display of prices on shelves 1, with a computer 2, a control transmitter 3 connected to it, and electronic display units 4 fastened to the edges of the shelves 1, whereby at least the shelves 1 equipped with display units 4 are provided with electrically conducting transmitter elements 6, which are fed by the control transmitter 3 with an alternating current and emit electromagnetic energy, the control transmitter 3 transmits to the display units 4, via the transmitter elements 6, data packets 25 which contain the data to be displayed, and which are separated from one another by pauses 26, and in each of the display units 4 there is a component 13 to receive the energy emitted by the transmitter elements 6 which feeds a charging current to a rechargeable power supply 15 which supplies at least a portion of the operating current of the display unit 4, characterized by the fact that the transmitter elements 6 are laid in the vicinity of the display units 4 on the edges of the shelves 1, that the components 13 of the display units 4 inductively receive the energy emitted by the transmitter elements 6, and that the control transmitter 3 sends an alternating current to the transmitter elements 6 in the pauses 26 between the data packets 25, and recharges the power supplies 15 of the display units 4.

Another feature of the invention resides broadly in the system characterized by the fact that the display units 4 receive the data packets 25 inductively.

Yet another feature of the invention resides broadly in the system characterized by the fact that the power supply 15 is a capacitor and/or a storage battery.

Still another feature of the invention resides broadly in the system characterized by the fact that the power sources 15 of the display units 4 are also recharged during the transmission of the data packets 25.

A further feature of the invention resides broadly in the system characterized by the fact that the display units 4, on the basis of the induced voltages, switch between the recharging phase during which the power source 15 is recharged and the phase during which a data packet 25 is transmitted.

Another feature of the invention resides broadly in the system characterized by the fact that the alternating current during the pauses 26 between the data packets 25 is of constant frequency and/or amplitude.

Yet another feature of the invention resides broadly in the system characterized by the fact that the control transmitter 3 modulates and/or superimposes the data packets 25 on an alternating current of constant frequency and amplitude by amplitude modulation and/or frequency modulation.

Still another feature of the invention resides broadly in the system characterized by the fact that the frequency and/or amplitude of the alternating current during the transmission of the data packets 25 differs from the frequency and/or amplitude during the pauses 26.

A further feature of the invention resides broadly in the system characterized by the fact that the display units 4, after the reception of a data packet 25, for their part emit a data packet which is transmitted inductively to the adjacent transmitter element 6 and from the latter via the control transmitter 3 to the computer 2.

Another feature of the invention resides broadly in the system characterized by the fact that the display units 4 have a component 13 used to transmit both energy and data.

Yet another feature of the invention resides broadly in the system characterized by the fact that the display units 4 are equipped with two separate components 13, one of which is used for energy transmission and one for data transmission.

Still another feature of the invention resides broadly in the system characterized by the fact that the component 13 is a flat coil wound in layers.

A further feature of the invention resides broadly in the system characterized by the fact that the transmitter elements 6 are single-conductor or multiple-conductor cables.

Another feature of the invention resides broadly in the system characterized by the fact that the transmitter elements 6 are flat ribbon cables.

Yet another feature of the invention resides broadly in the system characterized by the fact that the transmitter elements 6 are molded into a profile 8 which forms the edge of the shelf 1.

Still another feature of the invention resides broadly in the system characterized by the fact that at least the parts of the transmitter elements 6 adjacent to the display units 4 are laid in the form of loops.

A further feature of the invention resides broadly in the system characterized by the fact that the Control transmitter 3 is hard-wired to the transmitter elements 6.

Another feature of the invention resides broadly in the system characterized by a wireless connection between the computer 1 and the control transmitter 3 and/or between the control transmitter 3 and the transmitter elements 6.

Yet another feature of the invention resides broadly in the system characterized by the fact that the display units 4 limit the recharging current of their power supply 15, as soon as the voltage of the power supply 15 exceeds a specified threshold.

Still another feature of the invention resides broadly in the system characterized by a recharging station for separate display units 4 which have been removed from the shelves.

It will be appreciated from the foregoing that the present invention, may, in at least one preferred embodiment thereof, preferably relate to an electronic shelf edge display system, and in particular, to a shelf edge display system which incorporates display units which receive electrical power by means of wireless coupling.

In the field of modern retailing, the increasing use of bar codes to identify the nature and the price of products has resulted in the diminished use of individual price tags or stickers on each item of merchandise. In order to indicate the price of an item, a tag or label is applied to the edge of the shelf on which the item is located. However, there is no guarantee that the price on the label is the same as the price held in the store computer, and this can lead to customer complaints and possible legal action against the retailer. Updating such shelf edge labels is also very inefficient, as each label has to be reprinted and replaced manually. Accordingly, electronic shelf edge display tags have been developed, which display price and other information relating to the items of merchandise. As these display tags are linked to the store computer, it is ensured that the price displayed on a tag is the price which will be charged at the checkout. Furthermore, it is a simple matter to update the information on any particular display tag from the central computer by means of a transmission comprising an address code unique to each tag or group of tags and price data relating to the product associated with the tag or group of tags. This enables price changes, for instance promotional price decreases, to be effected with minimum fuss.

Certain such electronic display systems, such as that disclosed in U.S. Pat. No. 4,500,880 (Gomersall), comprise display tags which are physically connected to the store computer and a power source by means of conductive wires. These systems have the disadvantage that the hard-wired connection is cumbersome if tags are to be frequently moved. Furthermore, the contacts between the display tags and the connecting wires are subject to wear and tear, which soon results in unreliable data and/or power transmission to the tags.

Other types of electronic display system, such as that disclosed in U.S. Pat. No. 4,888,709 (Revesz), comprise independent display tags powered by internal batteries. Information is transmitted to these tags from the store computer by means of infra-red or radio transmitters, which are generally mounted in the ceiling of the store. These systems have the advantage that the display tags may be moved freely from place to place within the store. However, systems of this type still require checking to ensure that the individual batteries in each tag have not run down. Furthermore, the use of infra-red or radio transmissions over a relatively large distance, i.e. of the order of meters, can result in interference and/or signal shielding. This is because radio transmissions have a wavelength of the same order of magnitude as the dimensions of the store, and may therefore set up standing waves with resultant interference. Infra-red radiation does not penetrate solid objects very easily, and an infra-red transmission may therefore be inadvertently prevented from reaching a display unit.

Due to the shortcomings of presently available systems, as described above, there is a need for an electronic display system with the flexibility afforded by individual display units which are not hard-wired to the store computer or power source, and also the reliability of a separate power source other than internal batteries. Data transmission which is not subject to interference, shielding or faulty connection to the store computer is also required. Accordingly, we have developed a system which comprises one or more electronic display units adapted to be mounted on shelf edges, which shelf edges include at least one continuous charge carrier which is in communication with a central computer via one or more control transmitters, wherein said one or more display units each comprise an element with which said charge carrier forms a wireless link, the wireless link enabling the transmission of electrical power to said one or more display units.

The at least one charge carrier included in the shelf edge may comprise a single or multiple core cable, a loop or loops, or a flat ribbon or ribbons which may be moulded into the shelf edge profile material during manufacture or bonded onto the shelf edge profile material before or after installation or mounted separately on the shelf edge.

The element in the display unit with which the charge carrier forms a wireless link may consist of an inductive coil or coils, or a charge foil laminate.

The separation between the element in a display unit and the corresponding charge carrier included in the shelf edge will generally be constrained by the maximum depth of the particular shelf edge profile, typically in the range of 5 to 25 mm.

Electrical power is transmitted to the display unit by means of wireless inductive coupling or by wireless charge coupling or by wireless capacitance coupling between the shelf edge charge carrier or carriers and the element in the display unit.

Price data, address data and other information is preferably transmitted to a display tag by means of wireless coupling, which will generally be inductive coupling, between the charge carrying element included in the shelf edge and the element included in the display unit. The display unit may transmit data such as confirmation data back to the shelf edge charge carrier by means of similar wireless coupling. FIG. 4 schematically illustrates a return transmitting arrangement 200 which may be provided for this purpose. Suitable arrangements for this purpose will be well-known to those of ordinary skill in the art and will this not be described in any further detail herein.

In one embodiment of this invention, when data communication between the shelf edge charge carrier and the display tag is not active, the transmitter transmits a steady state alternating low voltage current in the shelf edge charge carrier, which current gives rise to an alternating low voltage current in the element included in the display unit. This current is used to charge a rechargeable battery, and/or a capacitor or other chargeable/dischargeable power source. In this embodiment, means are provided for switching between data transmission and the low voltage charging current within the control transmitter unit, and also for discrimination between data transmission and charging state in the display unit.

In a second embodiment of this invention, a continuous alternating voltage threshold is maintained in the shelf edge charge carriers for providing charging power to the display unit, and price data, address data and other information is transmitted by means of signals superposed on the continuous alternating voltage.

In a further embodiment of this invention, a continuous alternating voltage threshold is maintained in the shelf edge charge carriers for energy provision within the display units by means of coupling with a reciprocal charge carrying element within the display unit and thereby giving rise to sufficient electrical energy to power directly any or all of the memory, data processing, data display or data transmission functions included in the display unit. Price data, address data and other information is transmitted by means of signals superposed on the continuous alternating voltage.

The data for transmission to, and display on, the shelf edge units may be held in a central computer at, for example, the head office of a retailing chain, and be transmitted to individual store computers via telephone links or any other suitable means. Alternatively, the head office computer is omitted and the data is held in the individual store computers. It will be understood that the term "computer" is intended to cover any electronic data storage and processing device, for example EPOS (Electronic Point-Of-Sale) price file controllers and the like.

Data is transmitted to the display units from any combination of the above computer arrangements via one or more control transmitter units. These control transmitter units may be hard-wired to the shelf edge charge carrying elements, or they may transmit to intermediate gondola- or otherwise-mounted slave and/or process controllers by means of a wireless link which may comprise low, high, very high or ultra high frequency electromagnetic radiation. The intermediate slave and/or process controllers transmit the received data to the display units by means of the shelf edge charge carrier or carriers.

The display units are advantageously adapted so as to transmit data such as confirmation data back to the store computer or headquarters computer by means of wireless coupling with the shelf edge charge carriers and thence via the various intermediate units and control transmitters.

Preferred embodiments of the invention may offer the following advantages over known systems:

i) a short distance, very low power wireless radio frequency link between the display units and the control system, which wireless link is highly resistant to interference and allows secure two-way data communication; and ii) an independently powered tag that can be removed from a shelf edge without loss of memory for a predetermined period of time, typically up to a number of weeks; and iii) a low cost, variable capacity internal power source of indefinite life.

In the event that one or more display units are to be removed from the shelf edge for a time longer than the discharge time of the internal power source, the display units may be stored in a remote storage box in which charging may occur so as to maintain their memory states until they are put back on the shelf edge.

Examples of circuit boards, which may be utilized in accordance with the embodiments of the present invention, may be found in the following U.S. Pat. No. 5,303,466, which issued to Ozai et al. on Apr. 19, 1994; U.S. Pat. No. 5,304,252, which issued to Condra et al. on Apr. 19, 1994; and U.S. Pat. No. 5,304,428, which issued to Takami on Apr. 19, 1994.

Examples of microprocessors having addressing capabilities, which may be utilized in accordance with the embodiments of the present invention, may be found in the following U.S. Pat. No. 4,541,045, which issued to Kromer on Sep. 10, 1985; U.S. Pat. No. 4,419,727, which issued to Holtey et al. on Dec. 6, 1983; U.S. Pat. No. 4,307,448, which issued to Sattler on Dec. 22, 1981; and U.S. Pat. No. 4,202,035, which issued to Lane on May 6, 1980.

Examples of Schottky diodes, which may be utilized in accordance with the embodiments of the present invention, may be found in the following U.S. Pat. No. 5,304,944, which issued to Copeland et al. on Apr. 19, 1994; U.S. Pat. No. 5,302,956, which issued to Asbury et al. on Apr. 12, 1994; and U.S. Pat. No. 5,301,048, which issued to Huisman on Apr. 5, 1994.

Examples of Zener diodes, which may be utilized in accordance with the embodiments of the present invention, may be found in the following U.S. Pat. No. 5,305,176, which issued to Hirota on Apr. 19, 1994; U.S. Pat. No. 5,276,350, which issued to Merrill et al. on Jan. 4, 1994; and U.S. Pat. No. 5,252,908, which issued to Brokaw on Oct. 12, 1993.

Examples of non-volatile memory arrangements, which may be utilized in accordance with the embodiments of the present invention, may be found in the following U.S. Pat. No. 5,301,161, which issued to Landgraf et al. on Apr. 5, 1994; U.S. Pat. No. 5,292,681, which issued to Lee et al. on Mar. 8, 1994; and U.S. Pat. No. 5,293,062, which issued to Nakao on Mar. 8, 1994.

Examples of other components, such as transmission arrangements, wiring arrangements, and computer arrangements, which may conceivably be utilized in accordance with the embodiments of the present invention, may be found in the following U.S. Pat. No. 4,888,709, which issued to Revesz; U.S. Pat. No. 4,821,921, which issued to Stevens et al. on Apr. 11, 1989; U.S. Pat. No. 4,521,677, which issued to Sarwin in Jun. 1985; U.S. Pat. No. 4,500,880, which issued to Gomersall et al. in Feb. 1985; U.S. Pat. No. 4,339,772, which issued to Eilers et al. in Jan. 1982; and U.S. Pat. No. 4,028,537, which issued to Snow in June 1977.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, British Patent Application No. 9309246.8, filed on May 5, 1993, having inventors Chris Escritt and Magnus Hellquist, and British Laid Open Patent Application No. 9309246.8 and British Patent No. 9309246.8, as well as their published equivalents, and other equivalents or corresponding applications, if any, in corresponding cases in the United Kingdom, the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. System for the electronic display of information on at least one shelf, said system comprising:

a plurality of display unite for displaying information, each of said plurality of display units comprising at least one shelf display unit;

means for transmitting power to said plurality of display units;

said transmitting means for being disposed apart from said plurality of display units;

each of said plurality of display units comprising:
means for receiving power from said transmitting means;
means for displaying information; and
means for powering said displaying means at least partly from the power received by said receiving means;
said receiving means comprising means for receiving power from said transmitting means solely upon said display unit being disposed substantially adjacent to at least a portion of said transmitting means;
said transmitting means comprising a transmitter for at least transmitting power;

said at least a portion of said transmitting means comprising at least one transmitter element, said at least one transmitter element being electrically conductive and being configured to receive power from said transmitter;

at least one of said plurality of display units having means for disposing said at least one display unit on a shelf;

said receiving means of said at least one of said plurality of display units comprising means for receiving power from said transmitting means solely upon said display unit being disposed substantially adjacent to, and substantially on the same shelf as, said at least one of said at least one transmitter element;

said means for powering said displaying means comprising rechargeable means for powering said displaying means;

said transmitting means comprising means for at least substantially continuously providing, to said receiving means of said at least one display unit:
data for the display of information on said displaying means; and
power for providing energy to said rechargeable means;
said means for at least substantially continuously providing data and power to said at least one display unit comprising:

means for transmitting data to said at least one display unit in the form of intermittently transmitted data packets, the intermittent transmissions of data packets for being interrupted by pauses; end means for transmitting power;

said means for transmitting power comprising means for transmitting power to said at least one display unit during the pauses between the intermittent transmissions of data packets;

said receiving means comprising means for receiving power from said transmitting means during the pauses between intermittent transmissions of data packets; and said means for transmitting power during the pauses between the intermittent transmissions of data packets comprising means for transmitting power to said at least one display unit to recharge said rechargeable means during the pauses between the intermittent transmissions of data packets.

2. The system according to claim 1, wherein said transmitting means is configured such that each data packet is transmitted over a period of time having an order of magnitude of substantially less than one second.

3. The system according to claim 2, wherein said means for transmitting power comprises means for transmitting power to said at least one display unit during pauses between consecutive intermittent transmissions of single data packets.

4. The system according to claim 3, wherein said receiving means comprises a single circuit for receiving both power and data from said transmitting means.

5. The system according to claim 4, wherein:

said receiving means of said at least one of said at least one display unit is configured for inductively receiving energy emitted by said at least one transmitter element;

said transmitter is configured for sending an alternating current to said at least one transmitter element at least between the intermittent transmissions of data packets;

said receiving means of said at least one of said at least one display unit is configured for inductively receiving the intermittent transmissions of data packets;

said means for transmitting power at least between the intermittent transmissions of data packets comprises means for transmitting power to said at least one display unit both between the intermittent transmissions of data packets and during the intermittent transmissions of data packets;

said at least one of said at least one display unit comprises means for switching between:
a phase, during which said rechargeable power supply means is recharged; and
a phase, during which a data packet is transmitted; said transmitter is configured such that:
the data packets are incorporated with an alternating current of constant frequency and amplitude by way of frequency modulation; and
at least one parameter of the alternating current is different during transmissions of the data packets than between transmissions of the data packets;

said at least one of said at least one display unit comprises means for emitting an additional data packet upon receipt of a data packet;

said means for emitting comprises means for inductively transmitting the additional data packet to one of said at least one transmitting element;

said system further comprises a computer for transmitting data to said transmitter;

said one of said at least one transmitting element comprises means for transmitting the additional data packet to said transmitter and subsequently to said computer;

said receiving means comprises at least one component configured for providing both data and power to said displaying means;

said receiving means comprises at least one coil, said at least one coil comprising a flat coil being wound in layers;

said at least one transmitting element comprises at least one cable;

said at least one transmitting element comprises means for being molded into a profile forming a shelf edge;

said at least one transmitting element is configured for being disposed in a loop, along at least one shelf edge;

said at least one display unit comprises a plurality of display units;

said at least one transmitting element is configured for being disposed substantially adjacent to a plurality of said plurality of display units;

said transmitter is configured for transmitting to said at least one transmitting element by at least one hard-wired connection;

said computer is configured for transmitting to said transmitter by at least one hard-wired connection said at least one display unit is configured for limiting the recharging current of said rechargeable power supply means as soon as the voltage of said rechargeable power supply means exceeds a specified threshold;

said at least one transmitting element comprises a plurality of transmitting elements, each of said plurality of transmitting elements for being disposed on e different, corresponding shelf; and said system further comprises a recharging station for recharging at least one display unit which has been removed from a shelf.

6. System for the electronic display of information on at least one shelf, said system comprising:

a plurality of display units for displaying information, each of said plurality of display units comprising at least one shelf display unit;

means for transmitting signals to said plurality of display units to provide data to said plurality of display units;

said transmitting means for being disposed apart from said plurality of display units;

each of said plurality of display units comprising:
means for receiving signals from said transmitting means;
means for displaying information based on signals received by said receiving means; and
rechargeable means for powering said displaying means;

said transmitting means comprising means for et least substantially continuously providing, to said receiving means of at least one of said at least one display unit:
data providing for the display of information on said displaying means; and
power for providing energy to said rechargeable means;

said means for at least substantially continuously providing data and power to said at least one display unit comprising means for transmitting data to said at least one display unit in the form of intermittently transmitted data packets, the intermittent transmissions of data packets for being interrupted by pauses;

said means for et least substantially continuously providing data and power to said at least one display unit comprising means for transmitting power to said at least one display unit during the pauses between the intermittent transmissions of data packets; and said receiving means comprising means for receiving power from said transmitting means during the pauses between intermittent transmissions of data packets.

7. The system according to claim 6, wherein said transmitting means is configured such that each data packet is transmitted over a period of time having an order of magnitude of substantially less than one second.

8. The system according to claim 7, wherein said means for transmitting power comprises means for transmitting power to said at least one display unit during pauses between consecutive intermittent transmissions of single data packets.

9. The system according to claim 8, wherein said receiving means comprises a single circuit for receiving both power and data from said transmitting means.

10. The system according to claim 9, wherein:

said means for transmitting power at least between the intermittent transmissions of data packets comprises means for transmitting power to said at least one display unit to recharge said rechargeable means at least between the intermittent transmissions of data packets.

11. The system according to claim 10, wherein:

said receiving means comprises means for receiving power from said transmitting means solely upon said display unit being disposed substantially adjacent to at least a portion of said transmitting means.

12. The system according to claim 11, wherein:

said transmitting means comprises a transmitter for at least transmitting power;

said at least a portion of said transmitting means comprises at least one transmitter element, said at least one transmitter element being electrically conductive and being configured to receive power from said transmitter;

at least one of said at least one display unit has means for disposing said at least one of said at least one display unit on a shelf;

said means for disposing said at least one of said at least one display unit on a shelf comprises means for disposing said at least one of said at least one display unit substantially at an edge of a shelf;

said receiving means of said at least one of said at least one display unit comprises means for receiving power from said transmitting means solely upon said at least one of said at least one display unit being disposed substantially adjacent to, and substantially at the same shelf edge as, said at least one of said at least one transmitter element; and said receiving means of said at least one of said at least one display unit comprises means for receiving data from said transmitting means solely upon said at least one of said at least one display unit being disposed substantially adjacent to, and substantially at the same shelf edge as, said at least one of said at least one transmitter element.

13. The system according to claim 12, wherein:

said receiving means of said at least one of said at least one display unit is configured for inductively receiving energy emitted by said at least one transmitter element;

said transmitter is configured for sending an alternating current to said at least one transmitter element at least between the intermittent transmissions of data packets;

said receiving means of said at least one of said at least one display unit is configured for inductively receiving the intermittent transmissions of data packets;

said means for transmitting power at least between the intermittent transmissions of data packets comprises means for transmitting power to said at least one display unit both between the intermittent transmissions of data packets and during the intermittent transmissions of data packets;

said at least one of said at least one display unit comprises means for switching between:
  a phase, during which said rechargeable power supply means is recharged; and
  a phase, during which a data packet is transmitted; said transmitter is configured such that:
    the data packets are incorporated with an alternating current of constant frequency and amplitude by way of frequency modulation; and
    at least one parameter of the alternating current is different during transmission of the data packets than between transmissions of the data packets;

said at least one of said at least one display unit comprises means for emitting an additional data packet upon receipt of a data packet;

said means for emitting comprises means for inductively transmitting the additional data packet to one of said at least one transmitting element;

said system further comprises a computer for transmitting data to said transmitter;

said one of said at least one transmitting element comprises means for transmitting the additional data packet to said transmitter and subsequently to said computer;

said receiving means comprises at least one component configured for providing both data and power to said displaying means;

said receiving means comprises at least one coil, said at least one coil comprising a flat coil being wound in layers;

said at least one transmitting element comprises at least one cable;

said at least one transmitting element comprises means for being molded into a profile forming a shelf edge;

said at least one transmitting element is configured for being disposed in a loop, along at least one shelf edge;

said at least one display unit comprises a plurality of display units;

said at least one transmitting element is configured for being disposed substantially adjacent to a plurality of said plurality of display units;

said transmitter is configured for transmitting to said at least one transmitting element by at least one hard-wired connection;

said at least one display unit is configured for limiting the recharging current of said rechargeable power supply means as soon as the voltage of said rechargeable power supply means exceeds a specified threshold;

said at least one transmitting element comprises a plurality of transmitting elements, each of said plurality of transmitting elements for being disposed on a different, corresponding shelf; and said system further comprises a recharging station for recharging at least one display unit which has been removed from a shelf.

14. Method of operating a system for the electronic display of information on at least one shelf, said method comprising the steps of:

providing a plurality of display units for displaying information, each of the plurality of display units comprising at least one shelf display unit;

providing means for transmitting power to said plurality of display units;

said step of providing the plurality of display units comprising:
providing means for receiving power from the transmitting means;
providing means for displaying information; and
providing means for powering the displaying means at least partly from the power received by the receiving means; and said step of providing the receiving means comprising providing means for receiving power from the transmitting means solely upon the display unit being disposed substantially adjacent to at least a portion of the transmitting means;

said method further comprising the additional steps of:
disposing the display units on shelf means;
disposing the display units substantially adjacent to at least a portion of the transmitting means;
transmitting power to the display units with the transmitting means;
receiving power, with the receiving means, from the transmitting means solely upon the display units being disposed substantially adjacent to at least a portion of the transmitting means;
displaying information with the displaying means;
powering the displaying means at least partly from the power received by the receiving means;

said step of providing the transmitting means comprising:
providing a transmitter for at least transmitting power;
configuring the at least a portion of the transmitting means to comprise at least one transmitter element, the at least one transmitter element being electrically conductive and being configured to receive power from the transmitter;
configuring at least one display unit to have means for disposing the at least one display unit on a shelf;
configuring the receiving means of the at least one of the display unit to comprise means for receiving power from the transmitting means solely upon the at least one display unit being disposed substantially adjacent to, and substantially on the same shelf as, the at least one transmitter element;

said method further comprises the steps of:
disposing the at least one display unit on a shelf substantially at an edge of the shelf;
receiving power from the transmitting means, with the receiving means, solely upon the at least one display unit being disposed substantially adjacent to, and substantially at the same shelf edge as, the at least one of the at least one transmitter element;
transmitting data to the at least one display unit with the transmitting means;
displaying information, with the means for displaying information, based on data transmitted from the transmitting means;
wherein the receiving means receives data from the transmitting means solely upon the at least one of the at least one display unit being disposed substantially adjacent to, and substantially at the same shelf edge as, the at least one transmitter element;

wherein the means for powering the displaying means comprises rechargeable means for powering the displaying means;

wherein the transmitting means substantially continuously provides, to the receiving means of the at least one display unit:
data for the display of information on the displaying means; and
power for providing energy to the rechargeable means;

wherein the at least substantially continuous provision of data and power to the at least one display unit comprises:
transmitting data to the at least one display unit in the form of intermittently transmitted data packets, and interrupting the intermittent transmissions of data packets with pauses; and
transmitting power to the at least one display unit at the pauses between the intermittent transmissions of data packets;

wherein power is transmitted to the at least one display unit to recharge the rechargeable means during the pauses between intermittent transmissions of data packets; and the receiving means receives power from the transmitting means during the pauses between consecutive intermittent transmissions of data packets.

15. The method according to claim 14, wherein each date packet is transmitted, by the transmitting means, over e period of time having an order of magnitude of substantially less than one second.

16. The system according to claim 15, wherein power is transmitted, by the transmitting means, to said at least one display unit during pauses between consecutive intermittent transmissions of single data packets.

17. The system according to claim 16, wherein the receiving means comprises a single circuit for receiving both power and data from said transmitting means.

18. The method according to claim 17, further comprising the step of configuring the system such that:

the receiving means of the at least one of the at least one display unit is configured for inductively receiving energy emitted by the at least one transmitter element;

the transmitter is configured for sending an alternating current to the at least one transmitter element at least between the intermittent transmissions of data packets;

the receiving means of the at least one of the at least one display unit is configured for inductively receiving the intermittent transmissions of data packets;

the means for transmitting power at least between the intermittent transmissions of data packets comprises means for transmitting power to the at least one display unit both between the intermittent transmissions of data packets and during the intermittent transmissions of data packets;

the at least one of the at least one display unit comprises means for switching between:
a phase, during which the rechargeable power supply means is recharged; and
a phase, during which a data packet is transmitted; the transmitter is configured such that:
the data packets are incorporated with an alternating current of constant frequency and amplitude by way of frequency modulation; and at least one parameter of the alternating current is different during transmission of the data packets than between transmissions of the data packets;

the at least one of the at least one display unit comprises means for emitting an additional data packet upon receipt of a data packet;

the means for emitting comprises means for inductively transmitting the additional data packet to one of the at least one transmitting element;

the system further comprises a computer for transmitting data to the transmitter;

the one of the at least one transmitting element comprises means for transmitting the additional data packet to the transmitter and subsequently to the computer;

the receiving means comprises at least one component configured for providing both data and power to the displaying means;

the receiving means comprises at least one coil, the at least one coil comprising a flat coil being wound in layers;

the at least one transmitting element comprises at least one cable;

the at least one transmitting element comprises means for being molded into a profile forming a shelf edge;

the at least one transmitting element is configured for being disposed in a loop, along at least one shelf edge;

the at least one display unit comprises a plurality of display units;

the at least one transmitting element is configured for being disposed substantially adjacent to a plurality of the plurality of display units;

the transmitter is configured for transmitting to the at least one transmitting element by at least one wireless connection;

the at least one display unit is configured for limiting the recharging current of the rechargeable power supply means as soon as the voltage of the rechargeable power supply means exceeds a specified threshold;

the at least one transmitting element comprises a plurality of transmitting elements, each of the plurality of transmitting elements for being disposed on a different, corresponding shelf; and the system further comprises a recharging station for recharging at least one display unit which has been removed from a shelf.

19. The system according to claim 18, wherein the rechargeable power supply means comprises a capacitor.

20. The method according to claim 18, wherein the rechargeable power supply means comprises a storage battery.

* * * * *

UNITED STATES PATENT AND TRADEMARK OFFICE
CERTIFICATE OF CORRECTION

PATENT NO. : 5,548,282

DATED : August 20, 1996

INVENTOR(S) : Chris ESCRITT and Magnus HELLQUIST

It is certified that error appears in the above-indentified patent and that said Letters Patent is hereby corrected as shown below:

On the title page, item [75], after 'Escritt,', delete "Olncy" and insert --Buckinghamshire--.

On the title page, item [73], after 'AB,', delete "Upsala," and insert --Uppsala,--.

On the title page, item [56], under the "FOREIGN PATENT DOCUMENTS" section, before '3/1992', delete "2247460" and insert --2247760--.

In column 16, line 23, Claim 1, after 'display', delete "unite" and insert --units--.

In column 18, line 32, Claim 5, after 'on', delete "e" and insert --a--.

In column 18, line 53, Claim 6, after 'for', delete "et" and insert --at--.

In column 19, line 1, Claim 6, after 'for', delete "et" and insert --at--.

In column 22, line 30, Claim 15, after 'each', delete "date" and insert --data--.

UNITED STATES PATENT AND TRADEMARK OFFICE
CERTIFICATE OF CORRECTION

PATENT NO. : 5,548,282
DATED : August 20, 1996
INVENTOR(S) : Chris ESCRITT and Magnus HELLQUIST It is certified that error appears in the above-indentified patent and that said Letters Patent is hereby corrected as shown below:

In column 22, line 31, Claim 15, after 'over', delete "e" and insert --a--.

Signed and Sealed this

Fourth Day of February, 1997

Attest:

BRUCE LEHMAN

*Attesting Officer*  *Commissioner of Patents and Trademarks*